Dec. 4, 1962     C. E. FLOREN ET AL     3,066,908
ROTARY PLUG VALVE
Filed March 3, 1960     3 Sheets-Sheet 1
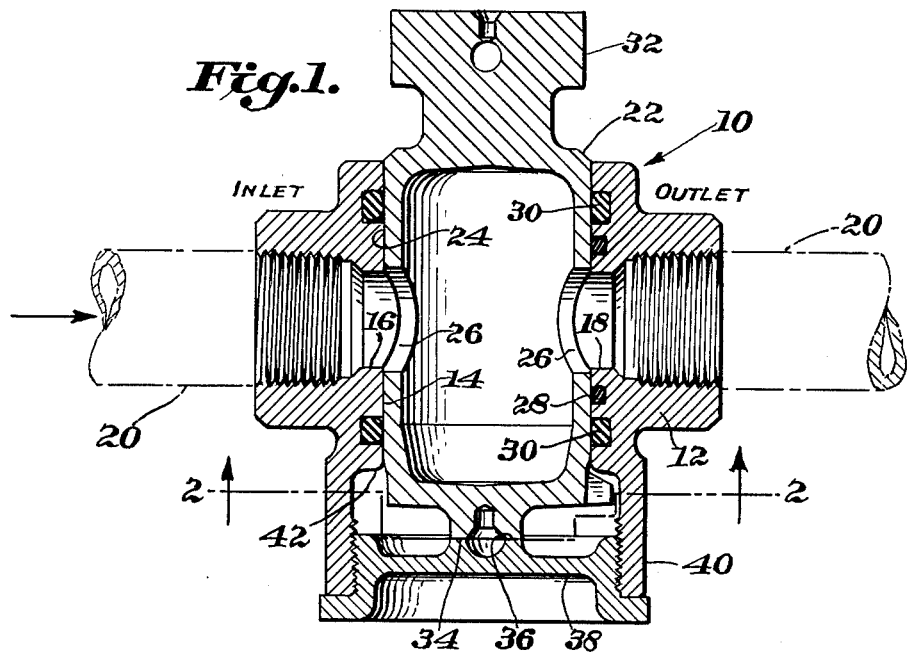
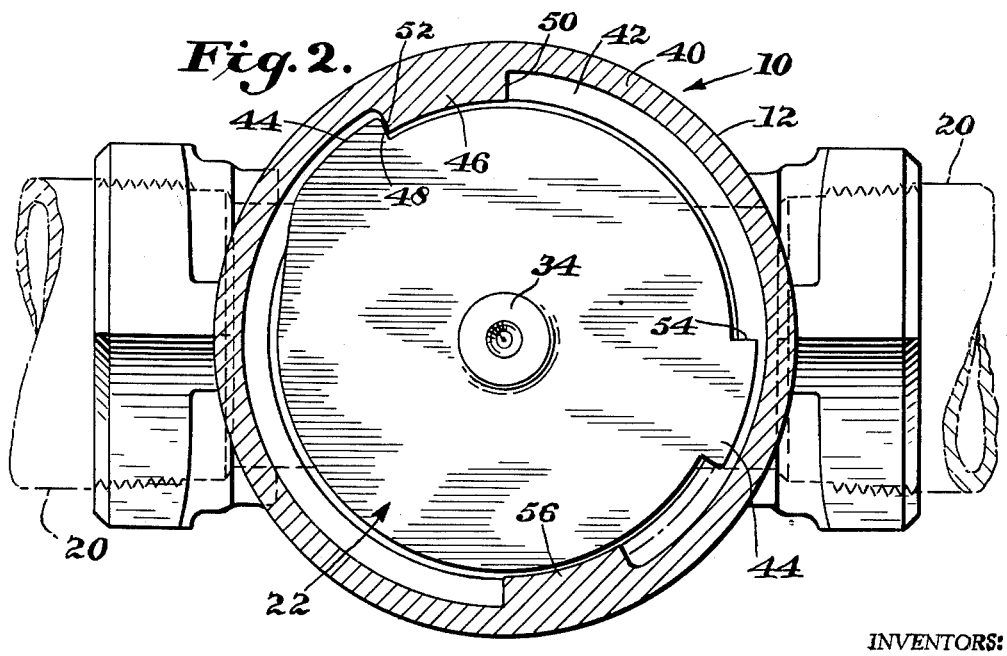
INVENTORS:
Carl E. Floren,
Cecil R. Foltz,
BY Cushman, Darby & Cushman
ATTORNEYS.

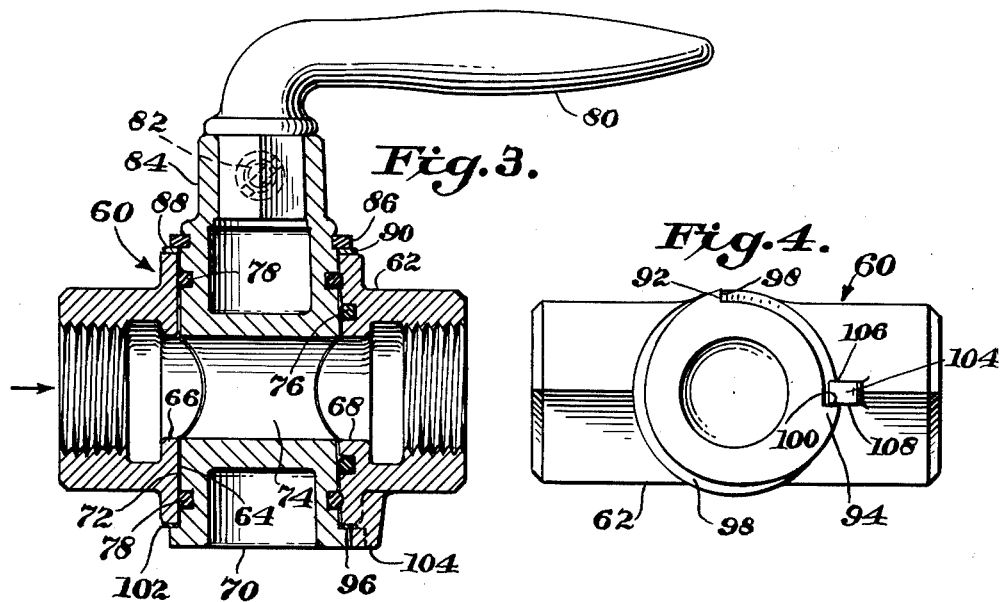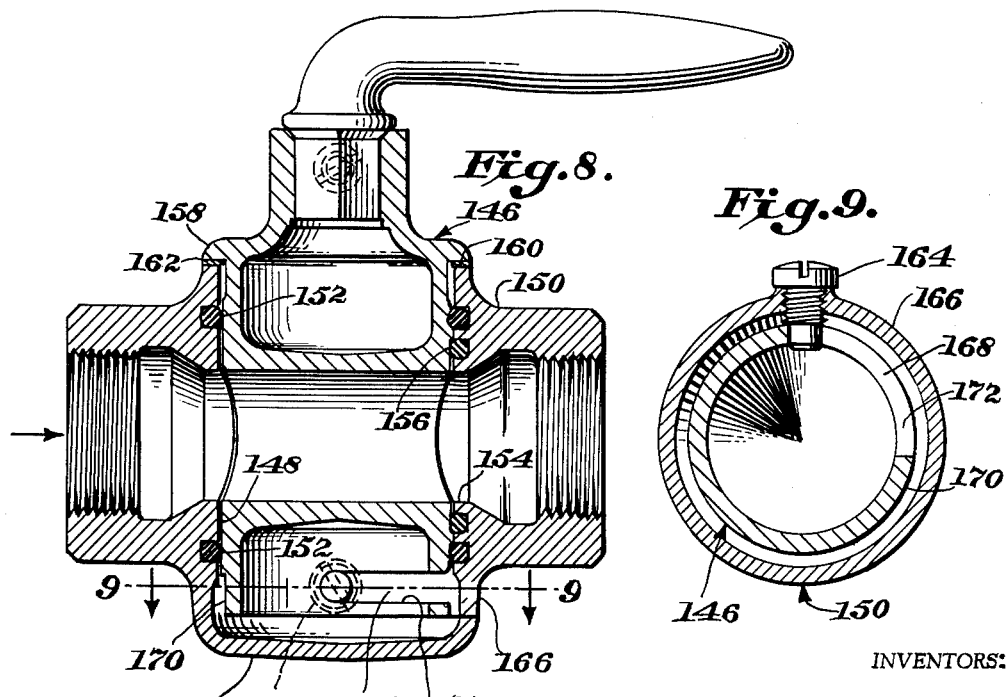

Dec. 4, 1962   C. E. FLOREN ET AL   3,066,908
ROTARY PLUG VALVE
Filed March 3, 1960   3 Sheets-Sheet 3
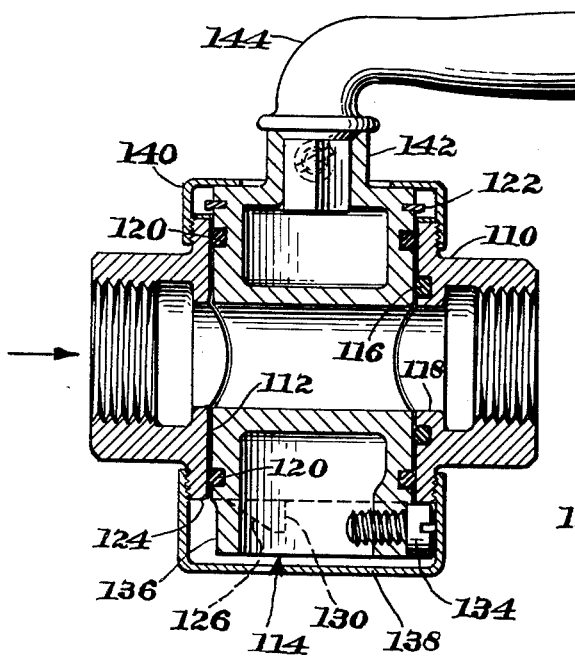
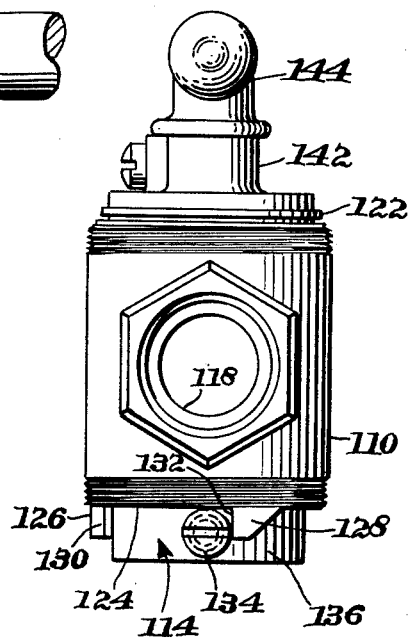
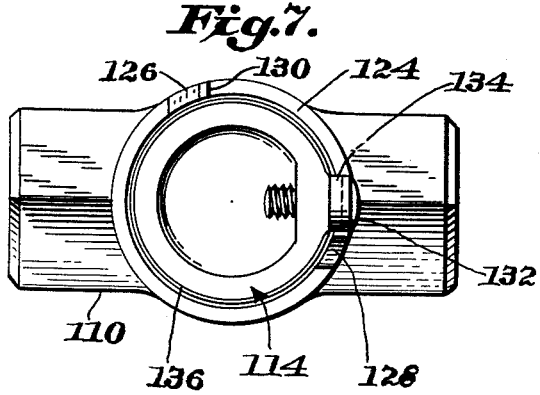
INVENTORS:
Carl E. Floren,
Cecil R. Foltz,
BY Cushman, Darby & Cushman
ATTORNEYS.

United States Patent Office 3,066,908
Patented Dec. 4, 1962

3,066,908
ROTARY PLUG VALVE
Carl E. Floren, Decatur, Ill., and Cecil R. Foltz, Whittier, Calif., assignors to Mueller Co., Decatur, Ill., a corporation of Illinois
Filed Mar. 3, 1960, Ser. No. 12,645
4 Claims. (Cl. 251—287)

This invention relates to improvements in rotary plug valves. While the invention will be described with particular reference to a rotary plug valve of the type shown in the patent to Mueller 2,547,831, it will be realized that many of the features of the invention are applicable to other types of rotary plug valves.

The valve disclosed in the aforementioned patent is of the type that has a cylindrical valve seat provided with an endless groove surrounding the seat outlet port, and an O-ring is disposed in such groove for sealing engagement with the opposed cylindrical surface of the plug. The valve seat is closed at one end by a combined sealing and plug-retaining closure threadedly engaged with an annular extension of the valve housing, while a seal is effected for the other end of the seat by an O-ring disposed in a groove in a reduced extension of the plug for sealing engagement with the opposed surface of a bore forming a reduced extension of the valve seat.

While the aforedescribed valve has proved to be eminently satisfactory for its intended purpose, it still is subject to being improved. For example, the valve shown in that patent is not balanced, i.e., the net pressure force acting on the valve, by the fluid which it controls, tends to urge the valve axially, with the result that at higher pressures the valve becomes somewhat more difficult to turn. Additionally, the abovedescribed valve is not provided with stop elements, frequently termed a "check" in the art, to limit the rotational movements of the plug to 90° in turning between open and closed positions.

It is, therefore, an object of this invention to provide an improved pressure-balanced rotary plug valve of the type that has an endless sealing ring in a seat groove surrounding the seat outlet port.

It is another object of this invention to provide an improved rotary plug valve of the aforedescribed type with novel stop elements to limit rotation of the plug to 90° in turning between open and closed positions.

It is another object of this invention to provide a pressure-balanced rotary plug valve with improved stop elements which not only serve the function of a check, but also aid in retaining the valve plug in its seat.

It is a further object of this invention to provide an improved rotary plug valve of simple and consequently inexpensive construction, but which also is extremely effective for its intended purpose.

Other objects and advantages of the present invention will become apparent from the following description and accompanying drawings in which:

FIGURE 1 is a vertical sectional view of a rotary plug valve embodying this invention.

FIGURE 2 is an enlarged sectional view taken substantially on line 2—2 of FIGURE 1.

FIGURE 3 is a view corresponding to FIGURE 1 but showing a modified form of a valve embodying this invention.

FIGURE 4 is a bottom view of the valve shown in FIGURE 3.

FIGURE 5 is a view corresponding to FIGURE 1 but illustrating another modified form of a valve embodying this invention.

FIGURE 6 is a right-hand end view of the valve shown in FIGURE 5, but with the end caps removed.

FIGURE 7 is a bottom view of the valve shown in FIGURE 6.

FIGURE 8 is a view corresponding to FIGURE 1 but illustrating still another modified form of a valve embodying this invention.

FIGURE 9 is a sectional view taken substantially on line 9—9 of FIGURE 8.

Referring now to FIGURES 1 and 2 of the drawings, there is shown a rotary plug valve 10 having a housing 12 provided with a cylindrical valve seat 14 of uniform diameter having diametrically opposite inlet and outlet ports 16 and 18. The ports 16 and 18 may be interiorly threaded at their outer ends for connecting the valve into a line 20. Rotatably mounted in the seat 14 is a valve plug 22 having an exterior cylindrical surface 24 of uniform slightly smaller diameter than that of the valve seat and coextensive therewith. The plug 22 may be formed as a hollow shell, as shown, having diametrically opposite ports 26 adapted to register with the seat ports 16 and 18 in the open position of the valve.

Surrounding the outlet port 18 in the seat 14 is an endless groove of uniform depth, and an O-ring 28 is disposed in such groove for sealing engagement with the opposed surface 24 of the plug 22 to form a tight seal when the valve is closed, as is disclosed in greater detail in the aforementioned patent to Mueller. Adjacent both of its ends, and outwardly beyond the O-ring 28, the seat 14 is provided with circumferential grooves, each generally rectangular in radial section. Disposed in each groove is an O-ring 30 which has sealing engagement with at least one wall of its groove, and also with the opposed cylindrical surface 24 of the plug 22 in order to provide a seal between the plug and the seat 14 at both ends of the latter. From this construction it will be seen that the plug 22 will be pressure balanced, i.e., the cross-sectional area of the plug exposed to fluid pressure in the line 20 urging the plug to move in one direction axially is exactly the same as that exposed to line pressure tending to urge the plug in the opposite axial direction. This result obtains, of course, because the plug surface portion contacted by the O-rings 30 are of the same diameter.

At one end, the plug 22 is reduced outwardly beyond the valve seat and terminates in a flattened noncircular head 32 for engagement by a wrench (not shown), or by hand, in order to turn the plug to open and close the valve. The other end of the plug 22 extends outwardly beyond the valve seat 14 and is reduced to terminate in an annular flat end bearing surface 34. Bearing against the end surface 34 of the plug 22 is a similar annular flat bearing surface 36 on the interior of a closure plug 38 threaded into the outer end of a sleeve-like annular extension 40 on the housing 12 concentric with the seat 14. The interior of the housing extension 40 is of greater diameter than that of the valve seat 14 so as to define an outwardly-facing shoulder, or arcuate retaining surface 42, at the junction between the inner end of the extension and the seat.

The valve plug 22 is provided, within the housing extension 40, with a pair of circumferentially-spaced radially-outwardly extending lugs 44 which overlap and engage the shoulder 42. It will be seen that the engagement between the valve and closure plug surfaces 34 and 36 prevents movement of the valve plug 22 axially in one direction, i.e., downwardly, as shown in FIGURE 1, while the engagement between the lugs 44 and the shoulder 42 retains the valve plug in its seat 14 against axial movement in the other direction, i.e., upwardly, as shown in FIGURE 1.

On its interior the housing extension 40 is provided with a radially inwardly extending projection 46 that defines a pair of circumferentially-spaced stop surfaces 48 and 50 disposed generally radially of and normal to the plug-retaining surface or shoulder 42. The two surfaces 48 and 50 on the projection 46 are adapted to be alternatively engaged by the circumferentially-opposed surfaces 52 and 54 on the lugs 44 in order to limit rotational movements of the plug 22. The surfaces 48, 50, 52 and 54 on the projection 46 and on the lugs 44 are so arranged that when the lug surface 52 is engaged with the projection 46 the valve is in open position, as shown in the drawings, but when the plug 22 is rotated through 90° to valve closed position, the lug surface 54 engages the surface 50 on the projection 46.

Preferably, the interior of the housing extension is provided with another radially inwardly extending projection 56, exactly the same as the projection 46 but disposed diametrically opposite the latter. It will be seen that if the closure 38 and the valve plug 22 are removed, or the latter shifted axially outwardly of the shoulder 42 sufficiently so that the lugs 44 cannot rotatively engage the projection 46, and then the valve plug is rotated through 180° and shifted back until the lugs 44 will engage the shoulder, the lugs 44 will cooperate with the projection 56 to limit rotational movements of the valve plug to 90° in turning between open and closed positions. Thus, the two projections 46 and 56 cause the stop or check lugs 44 to function properly no matter how the plug 22 is ssembled in the seat 14, i.e., misassembly is impossible.

All the parts of the valve 10 shown in FIGURE 1, with the exception of the O-rings 28 and 30, may be formed of metal, but such parts particularly lend themselves to being formed of relatively rigid, synthetic plastics. Valves formed of such plastic materials not only can be produced relatively inexpensively, but serve admirably for certain purposes.

Referring now to FIGURES 3 and 4 of the drawings, there is shown a modified form of valve 60 embodying the invention. The valve 60, like that shown in FIGURES 1 and 2, has a housing 62 provided with a cylindrical valve seat 64 of uniform diameter having diametrically opposite inlet and outlet ports 66 and 68. Rotatably mounted in the seat 64 is a valve plug 70 having an exterior cylindrical surface 72 of uniform slightly smaller diameter than that of the valve seat and coextensive therewith. The plug 70 may be formed with a transverse flow passage 74 of uniform diameter, the opposite ends of which align or register with the seat ports 66 and 68 in the open position of the valve 60. At its opposite ends, i.e., on opposite sides of the flow passage 74, the plug 70 may be formed with hollow socket-like or sleeve-like configurations in order to save weight and material. The valve seat 64 is provided with an endless groove which surrounds the outlet port 68 and has an O-ring 76 therein, to seal with the plug 70, similar to the construction shown in FIGURE 1. Likewise, O-rings 78 are employed to seal the space between the plug 70 and the seat 64 at opposite ends of the latter. In this instance, however, the O-rings 78 are disposed in circumferential grooves in the valve plug 70, instead of being disposed in seat grooves. Rotation of the valve plug 70 between open and closed position preferably is accomplished by means of a handle 80 secured, as by means of a set screw 82, in an interiorly reduced tubular extension 84 on one end of the plug.

Axial movement of the plug 70 in one direction is prevented by means of a split ring 86 disposed in a circumferential groove in the plug just outwardly beyond one end of the seat 64, and opposed to an annular bearing surface 88 on the housing. Preferably, a brass thrust washer 90 is interposed between the ring 86 and the housing surface 88. Axial movement of the plug 70 in the other direction is prevented by means of a pair of circumferentially-spaced and circumferentially-elongated radial lugs 92 and 94 on the plug which overlap an outwardly-facing annular bearing surface 96 on the housing 62 and also define circumferentially opposed stop surfaces 98 and 100. Again, preferably a brass thrust washer 102 is interposed between the lugs 92 and 94 and the bearing surface 96. Projecting axially outwardly from the bearing surface 96 circumferentially between the lugs 92 and 94 is a projection 104 defining a pair of oppositely facing stop surfaces 106 and 108. The housing stop surfaces 106 and 108 on the lug stop surfaces 98 and 100 are so arranged as to limit to 90° the rotational movements of the plug 70 in turning between open and closed positions.

Referring now to FIGURES 5 to 7, there is shown still another modified form of the invention similar in many respects to that shown in FIGURES 3 and 4. In this embodiment, a valve housing 110 is again provided with a cylindrical valve seat 112 and a cylindrical valve plug 114 is rotatable in the seat. An O-ring 116 disposed in an endless seat groove about the housing outlet port 118 again provides a seal between the plug 114 and the outlet port in the closed position of the valve. Again, O-rings 120 disposed in circumferential grooves in the plug 114 adjacent each end of the seat 112, form seals between the plug and the seat at the opposite ends of the latter. Axial movement of the plug 114 in one direction is prevented by a split ring arrangement 122 on the plug at one end of the seat 112 similar to that shown in FIGURE 3.

At the other end of the seat 112, the housing 110 is provided with a flat outwardly-facing annular bearing surface 124 having a pair of projections 126 and 128 thereon defining a pair of circumferentially-spaced stop surfaces 130 and 132 disposed generally radially and normally of the bearing surface 124. Disposed between the surfaces 130 and 132 for alternative cooperation therewith to limit the rotational movements of the plug to 90° in turning between its open and closed positions, is the head of a screw 134 threaded into a tapped radial aperture in a thickened portion of an annular extension 136 on the plug 114 extending outwardly beyond the surface 124. Obviously the screw head bears against the surface 124 to retain the plug 114 in its seat 112.

The screw 134, projections 126 and 128 and adjacent O-ring 120 may be protected from the weather, dirt, and the like, by a closure cap 138 threaded onto an exteriorly threaded annular extension on the valve housing 110. The opposite end of the seat 112 may likewise be protected by a similar cap 140 that is centrally apertured to accommodate the reduced extension 142 of the plug 114 in which is secured the valve operating handle 144.

Referring now to FIGURES 8 and 9 of the drawings there is shown a further modification of the invention wherein a cylindrical plug 146 is rotatable in a cylindrical valve seat 148 in a valve housing 150, and the seat is sealed at its opposite ends by O-rings 152 disposed in circumferential grooves in the seat in the manner illustrated in FIGURE 1. Similarly, a seal is effected between the seat outlet port 154 and the plug 146, in the closed position of the latter, by an O-ring 156 disposed in an endless seat groove surrounding the outlet port.

Axial movement of the valve plug 146 in one direction is prevented by a circumferential flange 158 on the plug located outwardly beyond one end of the seat 148 and opposed to an annular bearing surface 160 on the housing 150. Preferably, a brass thrust washer 162 is interposed between the flange 158 and the housing surface 160. Axial movement of the valve plug 146 in the opposite direction is prevented by means of a smooth inner end of a screw 164 threaded into a tapped radial aperture in a sleeve-like annular extension 166 of the housing 150 at the other end of the valve seat. The screw 164 extends into an arcuate slot 168 in a sleeve-like extension 170 of the plug 146, the annular extent of the slot being such as to limit to 90° the movements of the plug in turning between valve open and valve closed positions. It will be seen that the engagement between the inner end of the screw 164 and the lower surface 172 of the slot 168 will retain the plug 146 in its seat 148. Preferably, the valve is of the type known in the trade as having a "closed bottom," which means that one end of the valve seat 148 is closed by an integral part 174 of the housing 150.

Of course, the engagement between the inner end of the screw 164 and the opposed surfaces of the slot 168 retain the plug 146 in its seat 148 against axial movement in either direction. Hence, the flange 158 serves the primary purpose to keep grit and dirt from working between the valve plug 146 and its seat 148.

It thus will be seen that the objects of this invention have been fully and effectively accomplished. It will be realized, however, that the foregoing specific embodiments have been shown and described only for the purpose of illustrating the principles of this invention and are subject to extensive change without departure from such principles. Therefore, this invention includes all modifications encompassed within the spirit and scope of the following claims.

We claim:
1. A rotary plug valve comprising: a housing member having a cylindrical valve seat provided with an inlet port and a diametrically opposite outlet port; a cylindrical plug member rotatable in said seat and having a flow passage movable into or out of registration with said ports to open or close the valve, said members having two pairs of opposed cylindrical surface portions, one pair adjacent each end of said seat and the diameters of said plug member surface portions being equal; means defining a circumferential groove in one of said opposed surface portions of each of said pairs; a resilient pressure-deformable sealing ring in each of said grooves and engaged therewith and with the other surface portion of the corresponding pair to provide a seal between said members adjacent each end of said seat; means defining an endless groove in said seat disposed between said circumferential grooves and surrounding said outlet port; a resilient pressure-deformable sealing ring in said endless groove and engaged therewith and with the opposed surface of said plug member to form a seal therewith; an annular extension on said housing member at one end of said seat and of larger interior diameter than said cylindrical surface portions to form an interior outwardly-facing shoulder; radially-inwardly extending means on said extension defining a pair of circumferentially spaced stop surfaces extending normally and radially of said shoulder; and lug means integral with and extending radially outwardly from said plug member into overlapping engagement with said shoulder to prevent axial movement of said plug member in one direction, said lug means being alternatively engageable with said stop surfaces to limit to 90° the extent of rotation of said plug member in moving between valve open and valve closed positions; and a closure threadedly connected to said extension and bearing against the opposed end of said plug member to prevent axial movement thereof in the other direction, said members being constructed and arranged to be free of interengaged surfaces, save those of said shoulder and lug means, which prevent axial movement of said plug member in said one direction.

2. A rotary plug valve comprising: a housing member having a cylindrical valve seat and flow ports opening thereto; a plug member rotatable in said seat and having a flow passage movable into and out of registration with said seat ports to open and close the valve, said plug member having a cylindrical exterior surface portion opposed to said seat; an annular extension on said housing member at one end of and of larger interior diameter than said seat to form an interior outwardly-facing shoulder; a radially-inwardly extending projection on said extension; a pair of circumferentially-spaced lugs on and extending radially-outwardly from said plug member into overlapping engagement with said shoulder, said lugs being alternatively engageable with said projection to limit to 90° the extent of rotation of said plug member in moving between valve open and valve closed positions; and a closure detachably secured to said extension and having a central portion engaged with the opposed end of said plug member, said members being constructed and arranged to be free of interengaged surfaces, save those of said shoulder and lug means, which prevent axial movement of said plug member out of the other end of said seat.

3. A rotary plug valve comprising: a housing member having a cylindrical valve seat of uniform diameter throughout its length and a pair of diametrically disposed flow ports opening thereto; a cylindrical plug member rotatable in said seat and having a flow passage movable into and out of registry with said seat ports to open and close the valve; an annular extension on said housing member at one end of said seat and of larger interior diameter than the latter to form an interior outwardly facing shoulder constituting a retaining surface; means integral with and projecting radially inwardly of said extension to define a pair of circumferentially spaced stop surfaces extending generally normally and radially of said retaining surface; combined stop and retaining means integral with and projecting radially of said plug member into overlapping engagement with said retaining surface and circumferentially between said stop surfaces, whereby said overlapping engagement prevents axial movement of said plug member in one direction and the engagement of said combined stop and retaining means with said stop surfaces limits the extent of rotation of said plug member to 90° in turning between open and closed positions; and a closure detachably secured to said extension and having an inner portion bearing against the opposed end of said plug member to prevent axial movement of the latter in the other direction, said members being constructed and arranged to be free of interengaged surfaces, save those of said shoulder and retaining means, which prevent axial movement of said plug member in said one direction.

4. The structure defined in claim 3 including means defining a circumferential groove in the valve seat of each side of the seat ports; a resilient pressure-deformable sealing ring in each of said grooves and engaged therewith and with the opposed surface of the plug member to provide a seal between the plug member and the seat at each end of the latter; means defining an endless groove in said seat disposed between said circumferential grooves and surrounding one of said seat ports; a resilient-pressure-deformable sealing ring in said endless groove and engaged therewith and with the opposed surface of said plug member to form a seal therewith.

References Cited in the file of this patent

UNITED STATES PATENTS

| | | |
|---|---|---|
| 379,244 | Powell | Mar. 13, 1888 |
| 2,477,247 | Huberland | July 26, 1949 |
| 2,547,831 | Mueller | Apr. 3, 1951 |
| 2,604,293 | Phillips | July 23, 1952 |

FOREIGN PATENTS

| | | |
|---|---|---|
| 11,972 | Great Britain | 1914 |
| 378,652 | Great Britain | 1932 |
| 759,879 | France | 1933 |
| 1,095,876 | France | 1954 |